US007042350B2

(12) United States Patent
Patrick et al.

(10) Patent No.: US 7,042,350 B2
(45) Date of Patent: May 9, 2006

(54) SECURITY MESSAGING SYSTEM

(75) Inventors: Adamo Patrick, Bellmore, NY (US); Christopher D Martin, Plainview, NY (US); Stephen J. Yawney, Bay Shore, NY (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/750,089

(22) Filed: Dec. 31, 2003

(65) Prior Publication Data

US 2005/0146430 A1 Jul. 7, 2005

(51) Int. Cl.
*G08B 23/00* (2006.01)
*H04M 11/04* (2006.01)

(52) U.S. Cl. ...................... 340/521; 340/500; 340/506; 340/523; 340/539.11; 340/539.17; 340/825.36; 340/825.49; 379/37; 379/38; 379/39; 379/40; 379/41

(58) Field of Classification Search ........ 340/500–524, 340/539.11, 539.17, 541, 825.36, 825.49; 379/37–41

See application file for complete search history.

(56) References Cited

U.S. PATENT DOCUMENTS

| | | | | |
|---|---|---|---|---|
| 6,353,385 | B1 * | 3/2002 | Molini et al. | 340/506 |
| 6,617,969 | B1 * | 9/2003 | Tu et al. | 340/517 |
| 6,703,930 | B1 * | 3/2004 | Skinner | 340/539.11 |
| 6,717,513 | B1 * | 4/2004 | Sandelman et al. | 340/506 |

* cited by examiner

*Primary Examiner*—Jeffery Hofsass
*Assistant Examiner*—Lam Pham
(74) *Attorney, Agent, or Firm*—John F. Beninati; Robert S. Smith

(57) ABSTRACT

A system and method for delivering safety and security information that includes at least one event monitor. Each event monitor has an output. The system also includes apparatus for predetermining criteria for sorting the outputs of respective event monitors, apparatus for predetermining the format of a message related to respective events, apparatus for receiving the respective outputs of each of the event monitors and apparatus for sorting the outputs, based on the predetermining criteria for sorting the outputs, into categories related to distinct channels of communication, in addition to apparatus for delivering messages based on the predetermining criteria and predetermined format. In some forms the invention the apparatus for predetermining criteria for sorting the outputs of respective event monitors includes a web site accessible by an end-user. Similarly, the apparatus for predetermining the format of a message includes a web site accessible by an end user. The web site may be accessible only with a predetermined username and password.

32 Claims, 1 Drawing Sheet

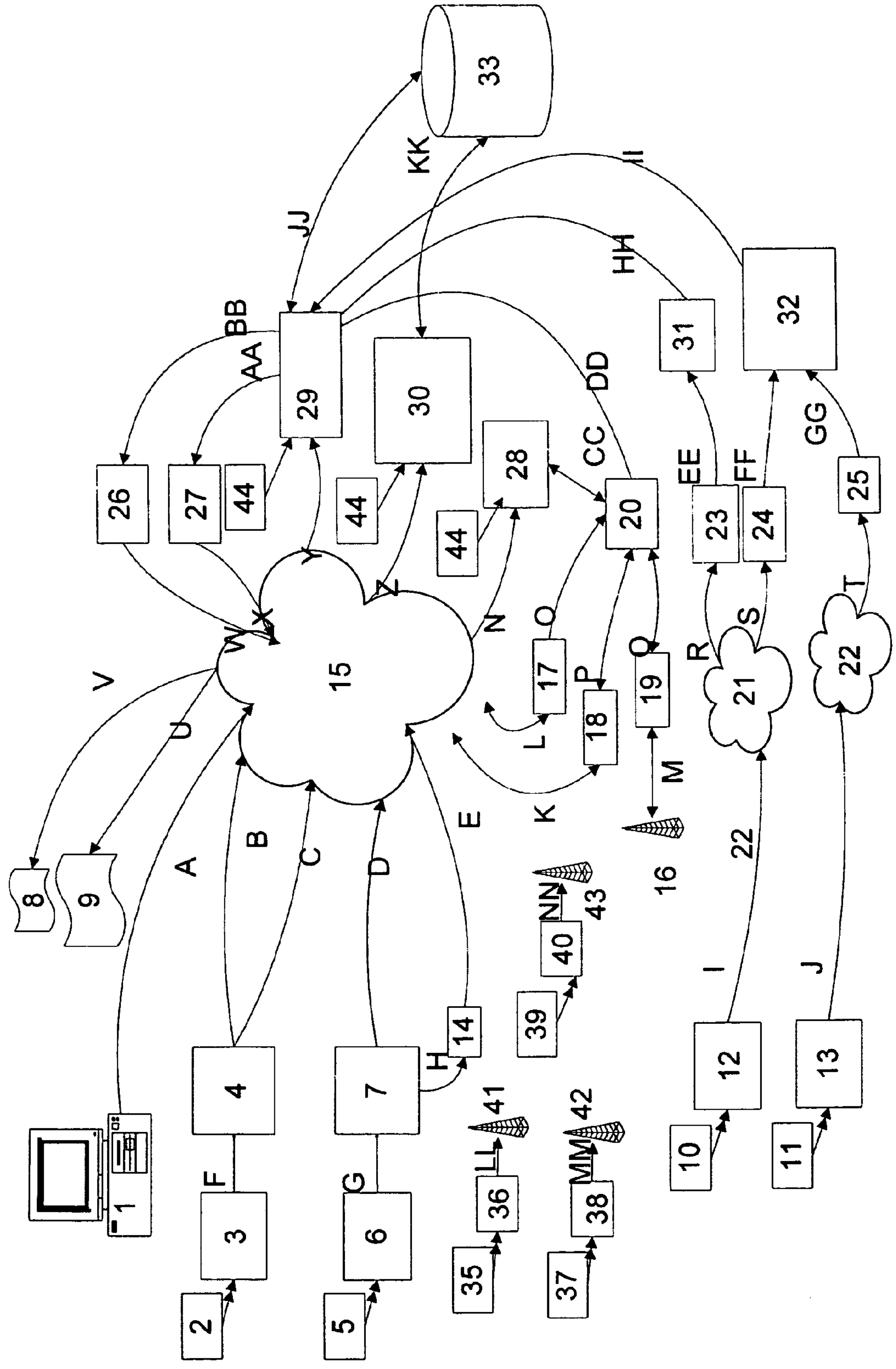
1
2
3
4
5
6
7
8
9
10
11
12
13
14
15
16
17
18
19
20
21
22
23
24
25
26
27
28
29
30
31
32
33
35
36
37
38
39
40
41
42
43
44
A
B
C
D
E
F
G
H
I
J
K
L
M
N
O
P
Q
R
S
T
U
V
W
X
Y
Z
AA
BB
CC
DD
EE
FF
GG
HH
II
JJ
KK
LL
MM
NN

SECURITY MESSAGING SYSTEM

BACKGROUND OF THE INVENTION

The invention relates to a comprehensive system and method for managing safety and security in commercial and residential buildings. The system is relevant to normal activity and alarm conditions including but not limited to door openings, system arming, system disarming, temperature changes, moisture changes in addition to break-in, medical and fire alarms. This system includes multiple alarm sensors in communication with one or more control systems that interface by means of the World Wide Web to external peripheral devices. Users of security systems want the ability to receive messages such as alarms, system status, opening and closings, etc., to their work and home email addresses, cell phones, and other PDA's and personal messaging devices such as Blackberries. A good example is receiving a notification when the children of the user arrive home from school and disarm the system or when an alarm occurs. The end user may desire messages that need not be sent to a central monitoring station supervised by trained personnel that have a primary mission of dispatching fire and/or police personnel when the data transmitted to the central monitoring station indicates to them that such action is appropriate. A perfect example here is a water/leak sensor whose fault can be transmitted to the homeowner, without the risk of accidentally dispatching police and/or fire responders.

A U.S. patent application Ser. No. 10/364,909, entitled Universal Gateway Module and having the same assignee as the present application was filed on Dec. 18, 2002. This application describes novel approaches to interfacing peripheral devices to one or more control systems. This application is incorporated herein by reference.

The prior art includes the ALARMNET® family of communication services provided by Ademco Group, Syosset, N.Y. and designed for the security industry. Types of services include both wireless and Internet based network services. These services are independent; however, a network control center allows messages received from one network to be redirected over another network. The wireless services are identified as ALARMNET-A, ALARMNET-M, and ALARMNET-C. The Internet service is identified as ALARMNET-I. The present invention utilizes these networks in addition to other communication networks.

The prior art includes various systems relying on cameras in the protected premises that are coupled by the Internet to allow remote observation of the premises.

SUMMARY OF THE INVENTION

It is an object of the present invention to provide a more comprehensive system and method for managing security in commercial and residential buildings.

Another object of the present invention is to allow users of security systems the ability to receive messages such as alarms, system status, door and window opening and closings, etc. to their work and home e-mail addresses, cell phones, and other PDA (personal digital assistant) devices in personal messaging devices such as BLACKBERRY® wireless devices.

Still another object invention is to provide a mechanism for directing at least some alarm conditions directly to such external peripheral devices and thus avoid the expense inherent in central station alarm condition monitoring by humans and the risks of one intentional dispatching of police and/or fire responses.

Yet another, object invention is to provide a system at extremely low cost and minimizes the necessity to purchase equipment. More particularly, it is an object of the present invention to do this without the need for a TCP/IP stack and/or Ethernet Adapter.

It has now been found that these and other objects of the invention may be achieved in a system and a method for delivering safety and security information which includes at least one event monitor. Each event monitor has an output. The system also includes apparatus for predetermining criteria for sorting the outputs of respective event monitors, apparatus for predetermining the format of a message related to respective events, apparatus for receiving the respective outputs of each of the event monitors and apparatus for sorting the outputs, based on the predetermining criteria for sorting the outputs, into categories related to distinct channels of communication, in addition to apparatus for delivering messages based on the predetermined criteria and predetermined format.

In some forms of the invention the apparatus for predetermining criteria for sorting the outputs of respective event monitors includes a web site accessible by an end-user. Similarly, the apparatus for predetermining the format of a message includes a web site accessible by an end user. The web site may be accessible only with a predetermined username and password.

The apparatus for predetermining criteria for sorting the outputs of respective event monitors may include a plurality of communication channels selected from the group comprising radio frequency transmissions, e-mail, text messaging, instant mail, pager, mobile phone, and wireless PDAs in addition to a central-station for processing the most serious events. The apparatus may also include a central-station for processing the most serious events.

Some forms of the system include at least one event monitor having an output, apparatus for predetermining criteria for sorting the outputs of respective event monitors, apparatus for receiving the respective outputs of each of the event monitors and apparatus for sorting the outputs, based on the predetermining criteria for sorting the outputs, into categories related to distinct channels of communication; and apparatus for delivering messages based on the predetermined criteria.

In such forms of the invention the apparatus for predetermining criteria for sorting the outputs of respective event monitors may include a plurality of communication channels selected from the group comprising radio frequency transmissions, e-mail, text messaging, instant mail, pager, mobile phone, and wireless PDAs in addition to a central-station for processing the most serious events.

The method in accordance with the present invention may include providing at least one event monitor having an output, predetermining criteria for sorting the outputs of respective event monitors, predetermining the format of a message related to respective events, receiving the respective outputs of each of the event monitors and sorting the outputs, based on the predetermined criteria for sorting the outputs, into categories related to distinct channels of communication, and delivering messages based on the predetermining criteria and predetermined format.

In some forms of the method the step of predetermining criteria for sorting the outputs of respective event monitors includes providing a web site accessible by an end-user. The step of predetermining the format of a message may include providing a web site accessible by an end user. In some cases the step of predetermining may include limiting access to the web site only with a predetermined username and password.

The step of predetermining criteria for sorting the outputs of respective event monitors may include the step of providing a plurality of communication channels selected from the group comprising radio frequency transmissions, e-mail, text messaging, instant mail, pager, mobile phone, and wireless PDAs in addition to a central-station for processing the most serious events.

BRIEF DESCRIPTION OF THE DRAWING

The invention will better understood by reference to the drawing which is a diagrammatic representation of one form of the system and method in accordance with the present invention.

DESCRIPTION OF THE PREFERRED EMBODIMENTS

A security system in a protected premise sends a Contact ID message (or any other type of alarm message format), that uniquely identifies the premises and customer and the relevant events at that premises. The Contact ID message is an industry-standard alarm equipment event reporting format. The message is sent by means of a telephone line connected to a modem (that is one of a bank of modems or equivalent) at a central station or by means of a dial-up or broadband Internet access. Examples of broadband Internet access include Symphony-I and 7845i provided by Ademco Group, Syosset, N.Y. The central system may be fully automated whereby each of a predetermined list of inputs will each produce a predetermined output to the specific end user by means of that end users personal messaging device, cell phone by means of the World Wide Web or other communication channel using SMTP or equivalent. The central station will process the events for relatively routine events to direct the Contact ID message to the personal messaging device or cell phone previously selected by the user. The user is able to manage the personal messaging device or cell phone as well as the event categories that will be directed to the personal messaging device or cell phone by means of a web site.

The messenger system in accordance with one form of the present invention may be located at the Central Station where personnel monitor incoming data and selectively dispatch fire, police and medical emergency responders. In other forms of the present invention the messenger system may be separated physically from the Central Station. In such embodiments of the present invention the messenger system includes fire, police, and medical response events as well as arming, disarming, temperature changes, moisture changes, door openings, door closings etc. In other forms of the invention the messenger system functions independently of (although harmoniously with) the conventional fire, police and medical emergency aspects and is limited to events that do not require the dispatch of fire, police or medical responders.

The user may at any time access their personal Messaging account at the central station via the web (i.e., Symphony account) and manage their database of email addresses and control how the Contact ID messages are directed as described above.

The following more detailed description of the system is best understood by first considering the following glossary of terms used herein.

OBJECTS AND ITEMS

Address List—A list of Electronic Mail, Instant Messenger, or other unique identifiers that may be used to distribute event messages.

Alarm Panel or Alarm System—Equipment installed in a building or outdoor space that detects undesired access, entry, occupation, or the presence of a hazard (ex.—fire or presence of lethal gasses), or the occurrence of an event within a designated space.

Alarm Monitoring Central Station—An entity that is employed to collect event messages from protected premises. Most often, police, fire, or other emergency personnel are dispatched to the appropriate location in response to the reception of events.

AlarmNet—A communications network operated by Ademco that uses Internet, Cellular, Mobitext, and other proprietary technologies. The network is used to upload and download alarm system configuration and operational data as well as act as a pathway for alarm system based events to be routed from the protected premises to an alarm monitoring central station.

MS—Messenger System. An electronic computing system that can create and send electronic forms of messages to persons (or foreign systems) in order to notify the recipient of undesired access, entry, occupation, or the presence of a hazard (ex.—occurrence of fire or presence of lethal gasses), or the occurrence of an event within a designated space.

CID—Contact ID, an industry-standard alarm equipment event reporting format.

End User—Owner/Manager of the property in which an alarm system is installed.

Event—The detection of a change in the protected premises. Often, the event may be stored in some form of non-volatile memory. Events are usually transmitted to an Alarm Monitoring Central Station.

PC—Personal Computer

System Administrator—Personnel employed by an Alarm Installation, Alarm Monitoring, or Alarm Manufacturer organization that has been assigned to perform system data maintenance.

The diagrammatic representation of the present invention includes the following communications links:

| | |
|---|---|
| A | broadband or dial-up into Internet point-of-presence |
| AA | outgoing e-mail requests |
| B | secure CID events to Alarmnet via network |
| BB | outgoing instant Mail requests |
| C | non-secure CID events to messenger service by a network |
| CC | bi-directional communication |
| D | non-secure CID events to messenger service by a network |
| DD | event notification |
| E | non-secure CID events to messenger service via Dial-up into Internet point-of-presence |
| F | ECP proprietary Enhance Communication Protocol |
| FF | RS-232 or TCP/IP |
| EE | RS-232 or TCP/IP |
| G | ECP or RS-232 |
| GG | RS-232 or TCP/IP |
| H | RS-232 |
| HH | event notification |
| I | non-secure events to messenger service via dial-up into the messenger system using industry-standard protocols |
| II | event notification |
| J | non-secure events to messenger service via dial-up into messenger service at 75 baud or higher |
| JJ | account configuration data input |
| K | in/out messages |
| KK | account configuration data input |

-continued

| | |
|---|---|
| L | in/out messages |
| LL | Alarmnet-C |
| M | radio network |
| MM | Alarmnet-M |
| N | incoming secure event reception |
| NN | Alarmnet-A |
| O | uni-directional communication |
| P | bi-directional communication |
| R | telephone line |
| S | telephone line |
| T | telephone line |
| U | Internet instant message delivery |
| V | Internet e-mail delivery |
| W | outgoing instant message |
| X | outgoing e-mail |
| Y | incoming non-secure event reception |
| Z | incoming Web based activity |

The alarm system end user of the system in accordance with the present invention creates a Messenger System MS Account. Account creation is performed upon a standard personal computer 1 with an industry standard Web Browser through the Internet 15 via an internet connection A. The end user logs into a public web site (hosted on the web site 30). A password and login name provided by the security system installer is used by the end user. The web site 30 is exposed to the Internet 15 via a public IP address. Web pages are served by the web server 30 via the internet connection (from the web site 30 to the personal computer 1 via Internet connection A, Internet 15, and incoming Web based activity Z). Messenger System MS account information is stored within the Messenger System Database 33. Account information is requested by the web-site 30 dynamic content engine via path KK. Account Information changes are stored within the database 33 via account configuration data input path KK.

Account Administration

An alarm system end user administers a Messenger System MS Account. A system administrator may also create, modify, and retrieve account information as stored in the Messenger System Database 33. Administration is performed upon a standard personal computer 1 with an industry standard Web Browser through the Internet 15 via an internet connection A. The end user or system administrator logs into a public web site (hosted on web site because 30) using a password and login name provided by the security system installer. The web site 30 is exposed to the Internet 15 via a public IP address. Web pages are served by the web server 30 via the internet connection (from the web site 30 to the standard personal computer 1 via broadband or dial-up into Internet point-of-presence A, Internet 15, and incoming Web based activity Z). Messenger System MS account information is stored within the Messenger System Database 33. Account information is requested by the web site 30 dynamic content engine via path KK. Account Information changes are stored within the database 33 via path account configuration data input KK.

The administration function includes account information changes as well as selecting which Alarm Panel events need to be distributed by Messenger System and to whom the messages shall be distributed. Address Lists can be created and maintained which will allow easy distribution of events to multiple recipients.

Event Generation

In most cases, a sensor of some form detects a change within the protected premises, however, a time occurrence may also trigger an event. The occurrence of the Event 2, 5, 35, 37, 39, may be filtered respectively by the alarm panels 3, 6, 36, 38, 40, and possibly transmitted to a monitoring authority at the central-station. Each event may be a door opening or closing, system arming, system disarming, temperature change, moisture change, break-in, medical alarm, fire alarm or other event.

Event Transmittal via Standard Dialer and Alarm Central Station Automation Equipment Historically, most alarm panels transmit event data to a monitoring authority via a standard telephone line and circuit. In this case, the alarm panel 12 uses a standard phone system with multiple incoming lines 21 to create a communication path with an industry standard alarm central station receiver 23. The events are communicated using frequency-shift-keying, touch-tone, or other tone patterns on the phone system via path I through 21 and path R. The events are then routed to an operator in the central station who then makes a decision to dispatch emergency authorities to the premises. The automation system 31 then transmits a representation of the event via path HH to the Messenger System Services 29.

Event Transmittal via Standard Dialer and Dedicated Central Station Alarm Receiver Equipment In this case, the alarm panel 12 uses a standard phone system with multiple incoming lines 21 to create a communication path with an industry standard alarm central station receiver 24. The events are communicated using frequency-shift-keying, touch-tone, or other tone patterns on the phone system via path I through 21 and path S. The receiver 24 then transmits a representation of the event via path FF to a proxy system 32 that then forwards the event's representational form via path II to the Messenger System Services 29.

Event Transmittal via Modem and Central Station Modem Reception Bank

In this case, the alarm panel 13 uses a standard phone system with multiple incoming lines 22 to create a communication path with an industry standard modem 25. The events are communicated using frequency-shift-keying, touch-tone, or other tone patterns on the phone system via path J through 22 and path T. The modem 25 then transmits a representation of the event via path GG to a proxy system 32 that then forwards the event's representational form via path 11 to the Messenger System Services 29.

Event Transmittal via AlarmNet-A

In this case, the alarm panel 40 communicates via NN to an AlarmNet-A transmitter 43. The events are communicated through the AlarmNet-A communication network to a matching AlarmNet-A receiver 16 and then via path M to the AlarmNet-A Service handler. A representation of the events are then forwarded to the AlarmNet Routing Service 20 via path 0. The Routing Service 20 then forwards the event's representational form via path DD to the Messenger System Services 29.

Event Transmittal via AlarmNet-M

In this case, the alarm panel 38 communicates via MM to an AlarmNet-M transmitter 42. The events are communicated through the AlarmNet-M communication network to a matching AlarmNet-M Service Handler 18 via the appropriate MobiText network carrier and the Internet via path K. Using path P, the AlarmNet-M Service Handler 18 sends a representation of the events to the AlarmNet Routing Service 20. The Routing Service 20 then forwards the event's representational form via path DD to the Messenger System Services 29.

Event Transmittal via AlarmNet-C

In this case, the alarm panel 36 communicates via LL to an AlarmNet-C transmitter and 41. The events are communicated through the AlarmNet-C communication network to a matching AlarmNet-C Service Handler 17 via the appropriate cellular network carrier and the Internet via path L. Using path 0' the AlarmNet-C Service Handler 17 sends a representation of the events to the AlarmNet Routing Service 20. The Routing Service 20 then forwards the event's representational form via path DD to the Messenger System Services 29.

Event Transmittal via AlarmNet-I, Type I

In this case, the alarm panel 3 communicates via F to an AlarmNet-I transmitter 4. The events are communicated through the AlarmNet-I communication network via B to a matching AlarmNet-I Service Handler 28 via the Internet via path N. Using path CC, the AlarmNet-I Service Handler 28 sends a representation of the events to the AlarmNet Routing Service 20. The Routing Service 20 then forwards the event's representational form via path DD to the Messenger System Services 29.

Event Transmittal via AlarmNet-I, Type II

In this case, the alarm panel 3 communicates via F to an AlarmNet-I transmitter 4. The events are communicated through path C and the Internet, then via path Y to the Messenger System Services 29.

Event Transmittal via Broad-Band Internet Connection

In this case, the alarm panel 6 communicates via G to an Ethernet-based network connection device 7. The events are communicated through the Internet via path D. Using path Y, a representation of the events is sent to the Messenger System Services 29 via path Y.

Event Transmittal via Dial-Up Internet Connection

In this case, the alarm panel 6 communicates via G to a modem-based network connection device 7 and 14 via H. The events are communicated through the Internet via path E and a national internet provider such as AOL. Using path Y, a representation of the events is sent to the Messenger System. Services 29 via path Y.

Messenger System Services Route Appropriate Messages to Recipients

The Messenger System Services 29 use account information stored in the Messenger System Database 33, retrieved via path JJ, to determine which events must be forwarded and to which recipient(s) the events must go. In addition to determining possible recipients, the Messenger Services 29 may transform the event's representation—textually or digitally—into the appropriate form for the recipient and the type of transport method used to deliver the message.

Message Transmittal Via Electronic Mail

If the Messenger System Services determine that an event must be transmitted to a recipient via E-Mail, a representation of the event is transmitted to a Simple Mail Transport Protocol Server 27 via path M. The SMTP Server then formulates and outgoing E-Mail message and sends it through the Internet 15 via path X to the recipient's E-Mail Host Account on an E-Mail pager, cell phone or Blackberry 8 via path V. The potential recipient may then retrieve E-Mails via a personal computer (with Internet Access), a cell phone (with the appropriate service), a pager (with the appropriate service), a BlackBerry device (with the appropriate service), or any other device that is capable of receiving E-Mail.

Message Transmittal Via Instant Message

If the Messenger System Services determines that an event must be transmitted to a recipient via an Instant Message, a representation of the event is transmitted to an Instant Messenger Client 26 via path BB. The IM Client then formulates an outgoing instant message and sends it through the Internet 15 via path W to the recipient's Instant Messenger Service Account via path U on a PC or cell phone 9. The potential recipient may then retrieve Instant Messages via a personal computer (with Internet Access), a cell phone (with the appropriate service), a pager (with the appropriate service), a BlackBerry device (with the appropriate service), or any other device that is capable of receiving Instant Messages.

The present invention may also include the use of a universal gateway module suitable for interfacing one of many different types of peripheral devices, such as telephones or PDA's, to a security system as described in U.S. patent application Ser. No. 10/364,909 filed on Dec. 18, 2002 and which relies on co-pending U.S. provisional application Ser. No. 60/434/854. As described in that application there is an increasing demand for interfacing existing security system to external peripherals and devices with functions that are not traditionally based on security system control. For example, it is desired to be able to use a telephone (corded or cordless) for various security system functions, including but not limited to entering system commands (such as arm or disarm), viewing or hearing system status, etc. Present security system control panels allow direct interfacing to some external peripherals. Most of those external peripherals communicate with the security system control panel via a propriety hardware/software communication channel specific to the design of the security system. Furthermore, each of those communication channels is associated with appropriate type of devices that can be interfaced to the control panel. The non-standard nature of the hardware/software communication channels of the control pannel, along with the need to change the panel's software when introducing a new peripheral, ends up limiting the number and the choices of new external peripherals/devices that could be interfaced to existing security systems.

In order to overcome the problems of the prior art, a universal gateway module is provided, which will interface one or more of various devices not traditionally used in security system control to an existing security system. The gateway module of the present invention will allow security system control panel s to interface to a wide range of new external peripheral devices that do not support the security system's non-standard communication channels. This will be achieved by the gateway's simpler and more standardized communication channel. The new gateway module will interface between the new external devices and the security system control panel in a way that it will be completely transparent to the security system control panel's hardware and software. In most cases, hardware or software changes will not be required to be made on the control panel in order to be able to interface to a variety of new external devices. There are many benefits for such a universal gateway module. With some engineering design effort on the new potential peripheral devices, and in most cases with no engineering design effort on existing security control panels, new, existing and future developed products (manufactured by many different companies) could be easily interfaced to existing control panels. The gateway will have a subassembly and an enclosure.

The sub-assembly will consist of a microprocessor and the appropriate interface circuitry drivers, connectors, power supply, etc.) which are mounted on a printed circuit board. The microprocessor (to include a built in memory to store the appropriate program and variables) will be able to transfer/control the appropriate data/signals between the control pane: and an external devices, accordingly. On its “front end”, the gateway module will communication with the existing communication channel of the control panel. On its “back end” the gateway nodule will communicate in sample and standrad methods with the new external peripheral/device. The gateway could communicate with the new external device via standard “transmit”/“receive” singal/protocol using a simple/standard hardware driver circuitry. The gateway could provided additional signals to the new external device in order to accommodate more specific needs, depending on the requirement dictated by the new external device. For example, such additional signals could be telco phone lines, trigger outputs etc.

Different additional options could be provided in addition to the basic functions described above. For example, the gateway can provide power to the new peripheral/device including during AC loss (battery back-up)

In particular, the present invention is a gateway module for interfacing a peripheral device to security system, the gateway module with a security system interface means for interfacing the gateway module with a security system control panel via a system bus and/or other appropriate dedicated signal lines, and a peripheral device interface means for interfacing the gateway module with a peripheral device. The gateway module also has processing means for controlling operation of the gateway module. The processing means is adapted to transceive security system data to and from the security system interface means, wherein the security system data to and from the in a security system protocol suitable for communication with a security system control panel, and to transceive peripheral data to and from the peripheral device interface means, wherein the peripheral device data configured in a peripheral device protocol suitable for communication with a peripheral device. The processing means is also adapted to translate security system data received from the security interface means to peripheral device data suitable for transmission to the peripheral device interface means, and also translate peripheral device data received from the peripheral device interface means to security system data suitable for transmission to the security system device interface means.

The peripheral device may be, for example, a telephone set or a handheld computing device. The peripheral device may communicate with the gateway module via a tethered connection such as a UART, USB or Ethernet LAN connection, or communications may be wireless, for example via the IEEE 802.11 standard or the BLUETOOTH standard.

The description of the preferred embodiment includes express reference to the Alarmnet family of communication services provided by Ademco group, Syosset New York for the security industry. It will be understood that the term communication service as used in the claims includes both the Alarmnet family of communication services as well as other services using wireless or Internet technologies.

The respective methods and systems in accordance with the present system may utilize a computer that includes a microprocessor and memory and which cooperates with software that is commercially available or within the skill of practitioners in the programming arts.

It will be obvious to those having skill in the art that many changes may be made to the details of the above-described embodiments of this invention without departing from the underlying principles thereof. Accordingly, it will be appreciated that this invention is also applicable to other systems. The scope of this invention should, therefore, be determined only by the following claims.

What is claimed is:

1. A system for delivering safety and security information which comprises:

at least one event monitor, each event monitor having an output;

means for predetermining criteria for sorting the outputs of respective event monitors;

means for predetermining the format of a message related to respective events;

means for receiving the respective outputs of each of said event monitors and means for sorting the outputs, based on the predetermining criteria for sorting the outputs, into categories related to distinct channels of communication;

means for delivering messages based on the predetermining criteria and predetermined format; and a gateway module for interfacing a peripheral device to the system comprising:

a. system interface means for interfacing the gateway module with a system control panel;

b. peripheral device interface means for interfacing the gateway module with a peripheral device; and c. processing means for controlling operation of the gateway module, the processing means adapted to:

i. transceive system data to and from the system interface means, the system data configured in a system protocol suitable for communication with a system control panel;

ii. transceive peripheral device data to and from the peripheral device interface means, the peripheral device data configured in a peripheral device protocol suitable for communication with a peripheral device;

iii. translate system data received from the system interface means to peripheral device data suitable for transmission to the peripheral device interface means; and iv. translate peripheral device data received from the peripheral device interface means to system data suitable for transmission to the system device interface means.

2. The system as described in claim 1 wherein said means for predetermining criteria for sorting the outputs of respective event monitors includes a web site accessible by an end-user.

3. The system as described in claim 1 said means for predetermining the format of a message includes a web site accessible by an end user.

4. The system as described in claim 2 wherein said web site is accessible only with a predetermined password.

5. The system as described in claim 4 wherein said web site is accessible only with a predetermined username and password.

6. The system as described in claim 1 wherein said means for predetermining criteria for sorting the outputs of respective event monitors includes a plurality of communication channels selected from the group comprising radio frequency transmissions, e-mail, text messaging, instant mail, pager, mobile phone, and wireless PDAs in addition to a central-station for at least some of the events.

7. The system as described in claim 2 wherein said means for predetermining criteria for sorting the outputs of respective event monitors includes a plurality of communication channels selected from the group comprising radio frequency transmissions, e-mail, text messaging, instant mail, pager, mobile phone, and wireless PDAs in addition to a central-station for at least some of the events.

8. The system as described in claim 3 wherein said means for predetermining criteria for sorting the outputs of respective event monitors includes a plurality of communication channels selected from the group comprising radio frequency transmissions, e-mail, text messaging, instant mail, pager, mobile phone, and wireless PDAs in addition to a central-station for at least some of the events.

9. The system as described in claim 4 wherein said means for predetermining criteria for sorting the outputs of respective event monitors includes a plurality of communication channels selected from the group comprising radio frequency transmissions, e-mail, text messaging, instant mail, pager, mobile phone, and wireless PDAs in addition to a central-station for at least some of the events.

10. The system as described in claim 5 wherein said means for predetermining criteria for sorting the outputs of respective event monitors includes a plurality of communication channels selected from the group comprising radio frequency transmissions, e-mail, text messaging, instant mail, pager, mobile phone, and wireless PDAs in addition to a central-station for at least some of the events.

11. A system for delivering safety and security information which comprises:

at least one event monitor, each event monitor having an output;

means for predetermining criteria for sorting the outputs of respective event monitors;

means for receiving the respective outputs of each of said event monitors and means for sorting the outputs, based on the predetermining criteria for sorting the outputs, into categories related to distinct channels of communication;

means for delivering messages based on the predetermining criteria; and a gateway module for interfacing a peripheral device to the system comprising:

a. system interface means for interfacing the gateway module with a system control panel;

b. peripheral device interface means for interfacing the gateway nodule with a peripheral device; and c. processing means for controlling operation of the gateway module, the processing means adapted to:

i. transceive system data to and from the system interface means, the system data configured in a system protocol suitable for communication with a system control panel;

ii. transceive peripheral device data to and from the peripheral device interface means, the peripheral device data configured in a peripheral device protocol suitable for communication with a peripheral device;

iii. translate system data received from the system interface means to peripheral device data suitable for transmission to the peripheral device interface means; and iv. translate peripheral device data received from the peripheral device interface means to system data suitable for transmission to the system device interface means.

12. The system as described in claim 11 wherein said means for predetermining criteria for sorting the outputs of respective event monitors includes a plurality of communication channels selected from the group comprising radio frequency transmissions, e-mail, text messaging, instant mail, pager, mobile phone, and wireless PDAs in addition to a central-station for at least some of the events.

13. The system as described in claim 11 wherein said means for predetermining criteria for sorting the outputs of respective event monitors includes a plurality of communication channels selected from the group comprising radio frequency transmissions, e-mail, text messaging, instant mail, pager, mobile phone, and wireless PDAs.

14. A system for delivering safety and security information which comprises:

at least one event monitor, each event monitor having an output;

means for predetermining criteria for sorting the outputs of respective event monitors;

means for receiving the respective outputs of each of said event monitors and means for sorting the outputs, based on the predetermining criteria for sorting the outputs, into categories related to distinct channels of communication;

means for delivering messages based on the predetermining criteria;

means including a central station for events of greatest immediate urgency; and a gateway module for interfacing a peripheral device to the system comprising:

a. system interface means for interfacing the gateway module with a system control panel;

b. peripheral device interface means for interfacing the gateway nodule with a peripheral device; and c. processing means for controlling operation of the gateway module, the processing means adapted to:

i. transceive system data to and from the system interface means, the system data configured in a system protocol suitable for communication with a system control panel;

ii. transceive peripheral device data to and from the peripheral device interface means, the peripheral device data configured in a peripheral device protocol suitable for communication with a peripheral device;

iii. translate system data received from the system interface means to peripheral device data suitable for transmission to the peripheral device interface means; and iv. translate peripheral device data received from the peripheral device interface means to system data suitable for transmission to the system device interface means.

15. A system for delivering safety and security information which comprises:

at least one event monitor, each event monitor having an output;

means for predetermining criteria for sorting the outputs of respective event monitors, said means for predetermining criteria for sorting the outputs of respective event monitors includes a plurality of communication channels selected from the group comprising radio frequency transmissions, e-mail, text messaging, instant mail, pager, mobile phone, and wireless PDAs in addition to a central-station for at least some of the events and said means for predetermining criteria for sorting the outputs of respective event monitors further includes a web site accessible by an end-user;

means for predetermining the format of a message related to respective events;

means for receiving the respective outputs of each of said event monitors and means for sorting the outputs, based on the predetermined criteria for sorting the outputs, into categories related to distinct channels of communication;

means for delivering messages based on the predetermined criteria and predetermined format; and a gateway module for interfacing a peripheral device to the system comprising:

a. system interface means for interfacing the gateway module with a system control panel;

b. peripheral device interface means for interfacing the gateway nodule with a peripheral device; and c. processing means for controlling operation of the gateway module, the processing means adapted to:

i. transceive system data to and from the system interface means, the system data configured in a system protocol suitable for communication with a system control panel;

ii. transceive peripheral device data to and from the peripheral device interface means, the peripheral device data configured in a peripheral device protocol suitable for communication with a peripheral device;

iii. translate system data received from the system interface means to peripheral device data suitable for transmission to the peripheral device interface means; and iv. translate peripheral device data received from the peripheral device interface means to system data suitable for transmission to the system device interface means.

16. A system for delivering safety and security information which comprises:

at least one event monitor, each event monitor having an output;

means for predetermining criteria for sorting the outputs of respective event monitors, said means for predetermining criteria for sorting the outputs of respective event monitors includes a plurality of communication channels including radio frequency transmissions, e-mail, text messaging, instant mail, pager, mobile phone, and wireless PDAs in addition to a central-station for at least some of the events and said means for predetermining criteria for sorting the outputs of respective event monitors further includes a web site accessible by an end-user;

means for predetermining the format of a message related to respective events;

means for receiving the respective outputs of each of said event monitors and means for sorting the outputs, based on the predetermined criteria for sorting the outputs, into categories related to distinct channels of communication;

means for delivering messages based on the predetermined criteria and predetermined format; and a gateway module for interfacing a peripheral device to the system comprising:

a. system interface means for interfacing the gateway module with a system control panel;

b. peripheral device interface means for interfacing the gateway nodule with a peripheral device; and c. processing means for controlling operation of the gateway module, the processing means adapted to:

i. transceive system data to and from the system interface means, the system data configured in a system protocol suitable for communication with a system control panel;

ii. transceive peripheral device data to and from the peripheral device interface means, the peripheral device data configured in a peripheral device protocol suitable for communication with a peripheral device;

iii. translate system data received from the system interface means to peripheral device data suitable for transmission to the peripheral device interface means; and iv. translate peripheral device data received from the peripheral device interface means to system data suitable for transmission to the system device interface means.

17. The system as described in claim 16 wherein said web site is accessible only with a predetermined username and password.

18. A method for delivering safety and security information which comprises:

providing at least one event monitor having an output;

predetermining criteria for sorting the outputs of respective event monitors;

predetermining the format of a message related to respective events;

receiving the respective outputs of each of said event monitors and means for sorting the outputs, based on the predetermining criteria for sorting the outputs, into categories related to distinct channels of communication;

delivering messages based on the predetermining criteria and predetermined format; and a method for controlling a system with a peripheral device comprising the steps of:

a. receiving, with a gateway module interconnected to the peripheral device, a first set of peripheral device data from the peripheral device, b. translating the first set of peripheral device data received from the peripheral device to a first set of system data suitable for transmission to a system control panel;

c. communicating with the system control panel by i. transmitting the first set of system data to the system control panel, and ii. receiving, with the gateway module, a second set of system data from the system control panel, d. translating the second set of system data received from the system control panel to a second set of peripheral device data suitable for transmission to the peripheral device; and e. transmitting the second set of peripheral device data to the peripheral device.

19. The method as described in claim 18 wherein the step of sorting the outputs of respective event monitors includes providing a web site accessible by an end-user.

20. The method as described in claim 18 wherein the step of predetermining the format of a message includes providing a web site accessible by an end user.

21. The method as described in claim 19 wherein the step a predetermining criteria includes providing a web site is accessible only with a predetermined password.

22. The method as described in claim 20 wherein the step of predetermining criteria includes providing a web site that is accessible only with a predetermined username and password.

23. The method as described in claim 18 wherein said step of predetermining criteria for sorting the outputs of respective event monitors includes providing a plurality of communication channels selected from the group comprising radio frequency transmissions, e-mail, text messaging, instant mail, pager, mobile phone, and wireless POAs in addition to a central-station for at least some of the events.

24. The method as described in claim 19 wherein said step predetermining criteria for sorting the outputs of respective event monitors includes providing a plurality of communication channels selected from the group comprising radio frequency transmissions, e-mail, text messaging, instant mail, pager, mobile phone, and wireless PDAs in addition to a central-station for at least some of the events.

25. The method as described in claim 20 wherein the step of predetermining criteria for sorting the outputs of respective event monitors includes providing a plurality of communication channels selected from the group comprising radio frequency transmissions, e-mail, text messaging, instant mail, pager, mobile phone, and wireless PDAs in addition to a central-station for at least some of the events.

26. The method as described in claim 21 wherein the step of predetermining criteria for sorting the outputs of respective event monitors includes providing a plurality of communication channels selected from the group comprising radio frequency transmissions, e-mail, text messaging, instant mail, pager, mobile phone, and wireless PDAs in addition to a central-station for at least some of the events.

27. The method as described in claim 22 wherein the step of predetermining criteria for sorting the outputs of respective event monitors includes providing a plurality of communication channels selected from the group comprising radio frequency transmissions, e-mail, text messaging, instant mail, pager, mobile phone, and wireless PDAs in addition to a central-station for at least some of the events.

28. A method for delivering safety and security information which comprises:

providing at least one event monitor having an output;

predetermining criteria for sorting the outputs of respective event monitors;

receiving the respective outputs of each of said event monitors and means for sorting the outputs, based on the predetermining criteria for sorting the outputs, into categories related to distinct channels of communication;

delivering messages based on the predetermining criteria and predetermined format; and a method for controlling a system with a peripheral device comprising the steps of:

a. receiving, with a gateway module interconnected to the peripheral device, a first set of peripheral device data from the peripheral device, b. translating the first set of peripheral device data received from the peripheral device to a first set of system data suitable for transmission to a system control panel;

c. communicating with the system control panel by i. transmitting the first set of system data to the system control panel, and ii. receiving, with the gateway module, a second set of system data from the system control panel, d. translating the second set of system data received from the system control panel to a second set of peripheral device data suitable for transmission to the peripheral device; and e. transmitting the second set of peripheral device data to the peripheral device.

29. The method as described in claim 28 wherein the step of sorting the outputs of respective event monitors includes providing a web site accessible by an end-user.

30. The method as described in claim 28 wherein the step of predetermining the format of a message includes providing a web site accessible by an end user.

31. The method as described in claim 29 wherein the step a predetermining criteria includes providing a web site is accessible only with a predetermined password.

32. The method as described in claim 31 wherein the step of predetermining criteria includes providing a web site that is accessible only with a predetermined username and password.

* * * * *

UNITED STATES PATENT AND TRADEMARK OFFICE

CERTIFICATE OF CORRECTION

PATENT NO. : 7,042,350 B2

APPLICATION NO. : 10/750089

DATED : May 9, 2006

INVENTOR(S) : Adamo Patrick, Christopher D. Martin, and Stephen J. Yawney

It is certified that error appears in the above-identified patent and that said Letters Patent is hereby corrected as shown below:

Title page item [76] Insert
The complete listing of inventors is Patrick; Adamo (Bellmore, NY), Martin; Christopher D (Plainview, NY), Yawney; Stephen J. (Bay Shore, NY); Tyroler, Dan (Great Neck, NY)

Signed and Sealed this

Sixth Day of March, 2007

JON W. DUDAS

*Director of the United States Patent and Trademark Office*